US012715408B2

United States Patent
(12) United States Patent
Kim

(10) Patent No.: US 12,715,408 B2
(45) Date of Patent: Aug. 25, 2026

(54) ELECTRONIC MECHANICAL BRAKE APPARATUS AND CONTROLLING METHOD THEREFOR

(71) Applicant: HYUNDAI MOBIS CO., LTD., Seoul (KR)

(72) Inventor: Jong Sung Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 19/048,039

(22) Filed: Feb. 7, 2025

(65) Prior Publication Data

US 2025/0388200 A1 Dec. 25, 2025

(30) Foreign Application Priority Data

Jun. 21, 2024 (KR) ........................ 10-2024-0080965

(51) Int. Cl.
*B60T 8/58* (2006.01)
*B60T 8/171* (2006.01)
*B60T 8/32* (2006.01)

(52) U.S. Cl.
CPC ................ *B60T 8/58* (2013.01); *B60T 8/171* (2013.01); *B60T 8/3255* (2013.01)

(58) Field of Classification Search
CPC .......... B60T 8/58; B60T 8/171; B60T 8/3255; B60T 17/221; B60T 8/172; B60T 13/74; B60T 2250/04; B60T 2270/402; B60Y 2306/13; B60Y 2400/81
See application file for complete search history.

(56) References Cited

FOREIGN PATENT DOCUMENTS

CN 117681850 A * 3/2024 .............. B60T 8/885

OTHER PUBLICATIONS

Machine Translation of CN117681850A PDF File Name: "CN117681850A_Machine_Translation.pdf" (Year: 2024).*

* cited by examiner

*Primary Examiner* — Grant Moubry
*Assistant Examiner* — Ruben Picon-Feliciano
(74) *Attorney, Agent, or Firm* — NovoTechIP International PLLC

(57) ABSTRACT

A method for controlling an electronic mechanical brake apparatus, the method comprising: sharing wheel speed information acquired from a plurality of wheel speed sensors by a plurality of wheel controllers using a first communication line and a second communication line, and determining whether it is possible to estimate a vehicle speed using the shared wheel speed information; In response to determining whether the vehicle speed can be estimated, generating an emergency braking force based on a change in the vehicle speed by the plurality of wheel controllers to brake the vehicle; In response to determining that the condition for estimating the vehicle speed is not satisfied, generating the emergency braking force based on the change in wheel speed by the plurality of wheel controllers to brake the vehicle.

6 Claims, 4 Drawing Sheets

ELECTRONIC MECHANICAL BRAKE APPARATUS AND CONTROLLING METHOD THEREFOR

CROSS-REFERENCE TO RELATED APPLICATIONS

This application claims the benefit of priority to Korean Patent Application No. 10-2024-0080965 filed in the Korean Intellectual Property Office on Jun. 21, 2024, the entire contents of which are incorporated herein by reference.

TECHNICAL FIELD

The present disclosure relates to an electronic mechanical brake apparatus and a controlling method therefor.

BACKGROUND

The description in this section merely provides background information related to the present disclosure and does not constitute the related art.

An electronic mechanical brake system senses a braking intention of a driver based on a BBW (brake-by-wire) system. The electronic mechanical system calculates the required braking force based on the sensed braking intention of a driver using an electronic control unit, and generates a braking force corresponding to the required braking force using an actuator.

A center controller of the electronic mechanical brake system determines all braking commands of a CBS (combined braking system), an ABS (anti-lock braking system), and an ESC (electronic stability control). The center controller delivers the braking command to a wheel controller mounted on an electronic mechanical brake actuator to generate a braking force in an electronic mechanical brake. Herein, the communication between the center controller and the wheel controller is operated based on CAN communication.

The electronic mechanical brake system may not perform backup braking using a hydraulic braking force. Accordingly, the electronic mechanical brake system is designed to enable the implementation of an electrical redundancy function. The redundancy function is configured by duplexing the center controller and also duplexing the CAN communication between the center controller and the wheel controller. The conventional electronic mechanical brake system has an issue in that if an error occurs in both of the duplexed center controllers or in both of the duplexed CAN communications, emergency braking of a vehicle is impossible.

SUMMARY

A main purpose of the present disclosure is directed to addressing an issue associated with the related art, and to estimating vehicle speed based on wheel speed information of each wheel measured from a plurality of wheel speed sensors when a center controller is in a fault state, and performing emergency braking based on the estimated vehicle speed.

In addition, another main purpose of the present disclosure is directed to allowing a plurality of wheel controllers to perform emergency braking of a vehicle based on the wheel speed information measured from each of the plurality of wheel speed sensors, even when both the center controller and a transceiver are faulty.

In addition, yet another main purpose of the present disclosure is directed to performing emergency braking of a vehicle based on a change in vehicle speed when the vehicle speed is increased even when a preset emergency braking force is generated under driving conditions of the vehicle performing emergency braking on a sloped road.

The aspects of the present disclosure are not limited to those mentioned above, and other aspects not mentioned herein will be clearly understood by those skilled in the art from the following description.

According to an embodiment, an electronic mechanical brake apparatus can estimate vehicle speed based on wheel speed information of each wheel measured from a plurality of wheel speed sensors when a center controller is in a fault state, and can perform emergency braking.

According to an embodiment, the electronic mechanical brake apparatus can perform emergency braking of a vehicle based on the wheel speed information measured from the plurality of wheel speed sensors, even when both the center controller and a transceiver are faulty.

According to an embodiment, the electronic mechanical brake apparatus can perform emergency braking under driving conditions of a vehicle performing the emergency braking on a sloped road.

DETAILED DESCRIPTION

Figure 1:
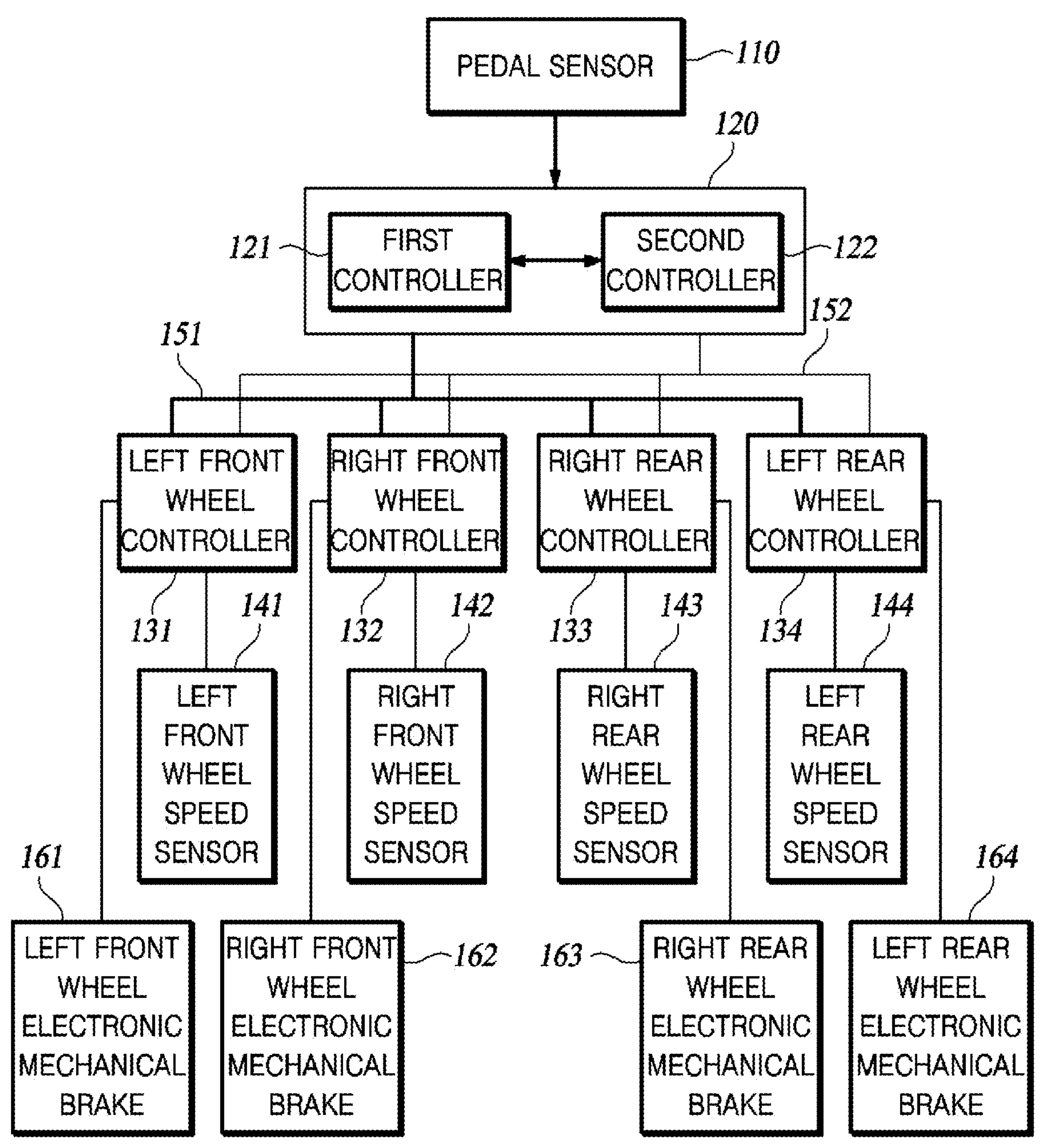
FIG. 1 is a block diagram illustrating the configuration of an electronic mechanical brake apparatus according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following detailed description, together with the accompanying drawings, is intended to describe exemplary embodiments of the present invention, and is not intended to represent the only embodiments in which the present invention may be practiced.

FIG. 1 is a block diagram illustrating the configuration of an electronic mechanical brake apparatus according to an embodiment of the present disclosure.

Referring to FIG. 1, the electronic mechanical brake apparatus includes all or part of a pedal sensor 110, a center controller 120, a plurality of wheel controllers 131, 132, 133 and 134, a plurality of wheel speed sensors 141, 142, 143 and 144, a plurality of electronic mechanical brakes 161, 162, 163 and 164, and a transceiver 151 and 152.

The pedal sensor 110 senses an input stroke corresponding to a braking intention of a driver. The pedal sensor 110 generates a pedal signal based on the sensed input stroke. The pedal signal is a braking request signal generated when a driver applies the input stroke to a pedal.

The pedal sensor 110 may be disposed adjacent to a brake pedal.

The center controller 120 has a duplexing configuration to implement control redundancy. The center controller 120 includes a first controller 121 and a second controller 122. The first controller 121 and the second controller 122 receive a pedal signal from the pedal sensor 110. Based on the received pedal signal, the first controller 121 and the second controller 122 determine a braking force required for a vehicle, and produce a braking command to be delivered to each wheel based on the determined braking force. Specifically, the first controller 121 and the second controller 122 produce a braking command required for each wheel based on the front/rear wheel distribution ratio of the vehicle, and transmit the produced braking command to a plurality of wheel controllers 131, 132, 133, and 134 to be described later.

The plurality of wheel controllers 131, 132, 133, and 134 generate a braking force by using each of the plurality of electronic mechanical brakes 161, 162, 163 and 164 disposed on each wheel. The plurality of wheel controllers 131, 132, 133, and 134 include a left front (FL) wheel controller 131, a right front (FR) wheel controller 132, a right rear (RR) wheel controller 133, and a left rear (RL) wheel controller 134.

The plurality of electronic mechanical brakes 161, 162, 163, and 164 include a left front wheel electronic mechanical brake 161, a right front wheel electronic mechanical brake 162, a right rear wheel electronic mechanical brake 163, and a left rear wheel electronic mechanical brake 164.

The plurality of wheel controllers 131, 132, 133, and 134 may independently generate a braking command even when not receiving the braking command from the center controller 120. Accordingly, the plurality of wheel controllers 131, 132, 133, and 134 according to an embodiment may produce an emergency braking command required for a vehicle and perform emergency braking of the vehicle using the plurality of electronic mechanical brakes 161, 162, 163, and 164 even when both the first controller 121 and the second controller 122 are determined to be in a fault state.

The first controller 121, the second controller 122, and the plurality of wheel controllers 131, 132, 133, and 134 according to an embodiment may be electronic control units (ECUs).

The plurality of wheel speed sensors 141, 142, 143, and 144 measure the wheel speed of each wheel. The plurality of wheel speed sensors 141, 142, 143, and 144 may be disposed in an area adjacent to each wheel. The plurality of wheel speed sensors 141, 142, 143, and 144 include a left front wheel speed sensor 141, a right front wheel speed sensor 142, a right rear wheel speed sensor 143, and a left rear wheel speed sensor 144.

The plurality of wheel speed sensors 141, 142, 143, and 144 are connected to the left front wheel controller 131, the right front wheel controller 132, the right rear wheel controller 133, and the left rear wheel controller 134, respectively.

According to an embodiment, the plurality of wheel controllers 131, 132, 133, and 134 receive wheel speed information measured from the plurality of wheel speed sensors 141, 142, 143, and 144. The plurality of wheel controllers 131, 132, 133, and 134 may estimate the speed of a vehicle (hereinafter, "vehicle speed") using the received wheel speed information.

The center controller 120 and the plurality of wheel controllers 131, 132, 133, and 134 according to an embodiment may perform wheel slip control of a vehicle using the vehicle speed estimated from the wheel speed information. Herein, the wheel slip control determines a wheel slip state based on the wheel speed information and the vehicle speed information, and performs control for systems such as ABS, TCS, and ESC. Accordingly, when the estimated vehicle speed information using the wheel speed information of each wheel may not be known, the center controller 120 and the plurality of wheel controllers 131, 132, 133, and 134 may not perform wheel slip control of a vehicle. In this connection, a specific control method in which the plurality of wheel controllers 131, 132, 133, and 134 according to another embodiment generate an emergency braking force based on the wheel speed information of each wheel to control the braking of the vehicle is described below.

The transceivers 151 and 152 according to an embodiment may be operated based on an in-vehicle communication method including CAN (controller area network) communication.

The transceivers 151 and 152 may transmit and receive signals between the center controller 120 and the plurality of wheel controllers 131, 132, 133, and 134.

The transceivers 151 and 152 have a duplexed configuration to implement communication redundancy. For example, the transceivers 151 and 152 may be configured with a first communication line 151 and a second communication line 152. The first communication line 151 and the second communication line 152 are configured by wiring between the center controller 120 and the plurality of wheel speed sensors 141, 142, 143, and 144. Simultaneously, the first communication line 151 and the second communication line 152 are configured to be connected between the plurality of wheel speed sensors 141, 142, 143, and 144.

For example, when it is determined that the operation of the first communication line 151 is impossible, the center controller 120 and the plurality of wheel controllers 131, 132, 133, and 134 may transmit and receive a braking signal or a feedback signal using the second communication line 152.

The center controller 120 and the plurality of wheel controllers 131, 132, 133, and 134 define a characteristic signal that changes periodically, and transmit and receive the defined characteristic signal between each other at regular intervals. For example, when it is determined that a characteristic signal has not been received from any one electronic control unit, the state of the corresponding electronic control unit may be assumed to be a non-functional state. Herein, the characteristic signal may be a failure detection signal for detecting a fault state of the electronic control unit.

The center controller 120 and the plurality of wheel controllers 131, 132, 133, and 134 may transmit and receive characteristic signals using at least one of the first communication line 151 and the second communication line. For example, when it is determined that the plurality of wheel controllers 131, 132, 133, and 134 have not received a characteristic signal from the center controller 120 and have received a characteristic signal among the plurality of wheel controllers 131, 132, 133, and 134, the plurality of wheel controllers 131, 132, 133, and 134 may determine that the center controller 120 is in a fault state.

Figure 2:
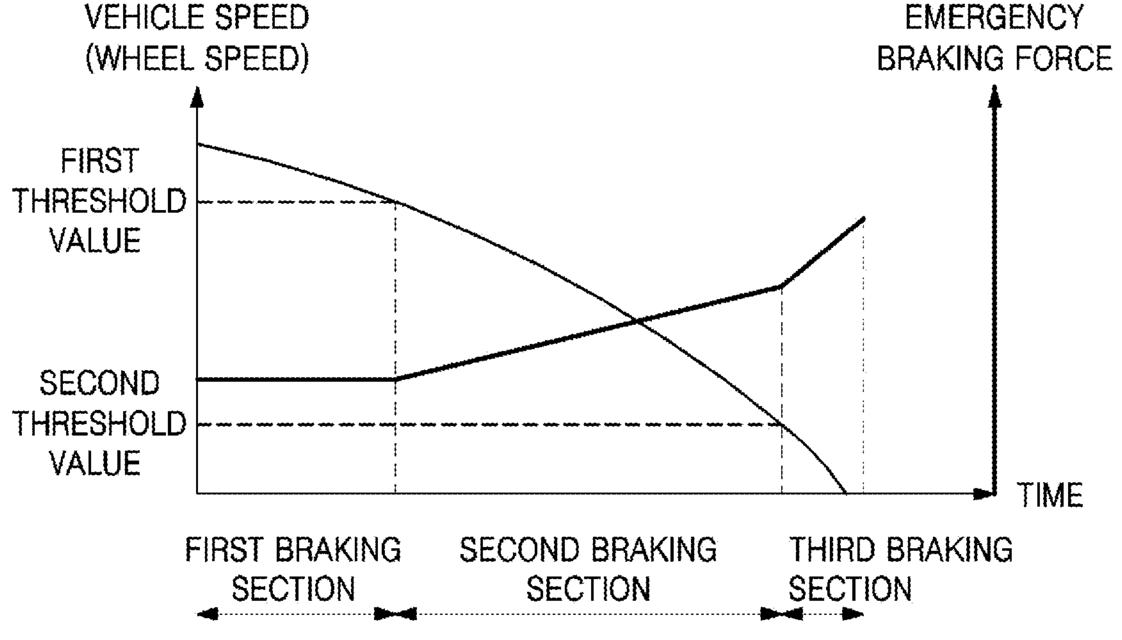
FIG. 2 is a graph showing a section-wise emergency braking force based on changes in vehicle speed or wheel speed according to an embodiment of the present disclosure.

FIG. 2 is a graph showing a section-wise emergency braking force based on changes in vehicle speed or wheel speed according to an embodiment of the present disclosure.

Referring to FIGS. 1 and 2, when the center controller 120 according to an embodiment is in a fault state, the plurality of wheel controllers 131, 132, 133, and 134 do not receive a braking command determined from the center controller 120. However, the plurality of wheel controllers 131, 132, 133, and 134 may acquire wheel speed information measured from the plurality of wheel speed sensors 141, 142, 143, and 144 respectively connected thereto, and share the acquired wheel speed information using at least one operable among the first communication line 151 and the second communication line 152. Accordingly, even when the center controller 120 is in a fault state, the plurality of wheel controllers 131, 132, 133, and 134 may estimate the vehicle speed using the shared wheel speed information.

Based on the vehicle speed information and wheel speed information, the plurality of wheel controllers may control wheel slip of a vehicle. Accordingly, the plurality of wheel controllers 131, 132, 133, and 134 may monitor changes in the estimated vehicle speed and determine an emergency braking force based on the monitored changes in the vehicle speed.

For example, when the center controller 120 of the running vehicle is in a fault state, the plurality of wheel controllers 131, 132, 133, and 134 perform emergency braking control of the vehicle based on the vehicle speed information. In order to explain the section-by-section emergency braking based on the changing vehicle speed, a first braking section, a second braking section, and a third braking section are explained.

The first braking section according to an embodiment means a section in which, when the vehicle speed is determined to be higher than a first threshold value, the plurality of wheel controllers 131, 132, 133, and 134 maintain a preset emergency braking force by using the plurality of electronic mechanical brakes 161, 162, 163 and 164 to decrease the vehicle speed. Herein, the first threshold value may be a speed limit value for preventing a collision with a rear vehicle in the same lane. For example, when a vehicle running at a speed higher than the first threshold value suddenly brakes, a collision may be caused from a rear vehicle in the same lane. Accordingly, the first braking section may limit the emergency braking force of the vehicle to a relatively low deceleration by limiting the vehicle speed, such as the first threshold value.

The second braking section according to an embodiment means a section in which the emergency braking force of a vehicle is increased from a point in time when the vehicle speed is determined to be lower than the first threshold value. The second braking section may increase the emergency braking force of the vehicle based on the change in the vehicle speed. Accordingly, although the emergency braking force diagrams of the second braking section in FIG. 2 is illustrated as increasing linearly, it is not limited thereto.

The second braking section may mean a section in which the emergency braking force of a vehicle is increased because the vehicle speed is decreased compared to the first braking section and the possibility of a collision with a rear vehicle in the same lane is significantly reduced.

The third braking section according to an embodiment means a section from the point in time when the vehicle speed is determined to be lower than a second threshold value as the vehicle speed is decreased until a vehicle stops. Herein, the second threshold value may be a speed limit value of a vehicle in which there is no issue with the braking stability of the vehicle even when wheel slip, such as a wheel lock phenomenon, occurs as the vehicle speed is decreased. As the vehicle speed is decreased, for example, when the vehicle speed is determined to be 10 kph (kilometers per hour) or less, not performing wheel slip control such as ABS (anti-lock braking system) control may minimize the braking distance of a vehicle. Accordingly, the third braking section may stop the vehicle by generating an emergency braking force equivalent to higher deceleration than the second braking section.

Figure 3:
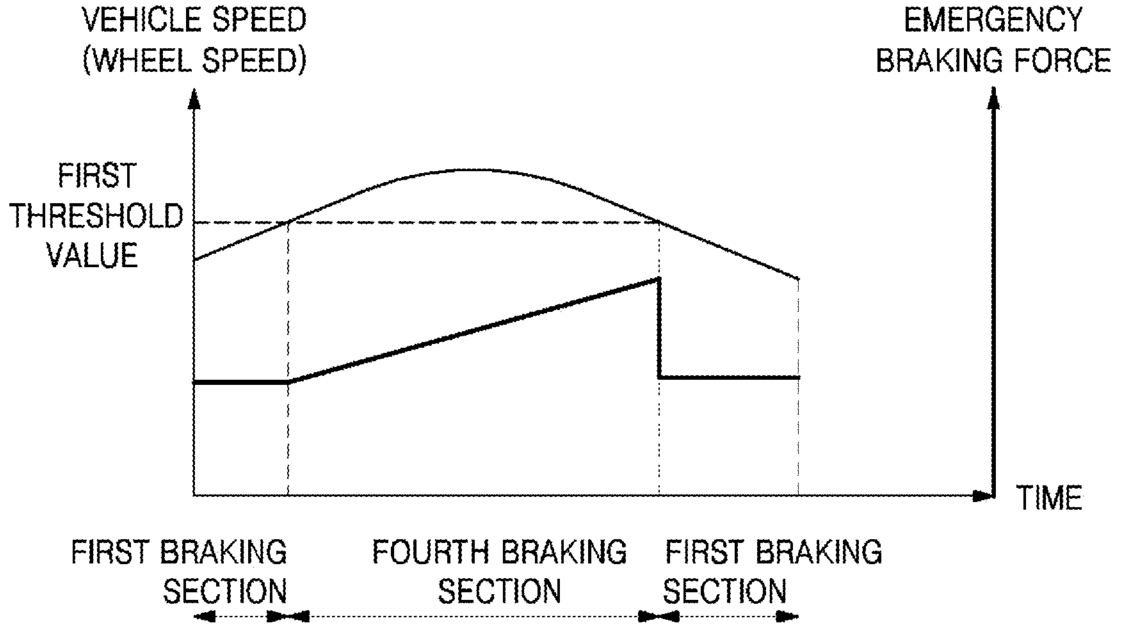
FIG. 3 is a graph showing a section-wise emergency braking force based on changes in vehicle speed or wheel speed under driving conditions for performing emergency braking when a vehicle according to an embodiment of the present disclosure drives down a sloped road.

FIG. 3 is a graph showing a section-wise emergency braking force based on changes in vehicle speed or wheel speed under driving conditions for performing emergency braking when a vehicle according to an embodiment of the present disclosure drives down a sloped road.

Referring to FIGS. 1 and 3, when the center controller 120 is in a fault state, the plurality of wheel controllers 131, 132, 133, and 134 do not receive a braking command determined from the center controller 120. However, the plurality of wheel controllers 131, 132, 133, and 134 may acquire wheel speed information measured from the plurality of wheel speed sensors 141, 142, 143, and 144 respectively connected thereto, and share the acquired wheel speed information using at least one operable among the first communication line 151 and the second communication line 152. Accordingly, even when the center controller 120 is in a fault state, the plurality of wheel controllers 131, 132, 133, and 134 may estimate the vehicle speed using the shared wheel speed information.

For example, when the center controller 120 of the running vehicle is in a fault state, the plurality of wheel controllers 131, 132, 133, and 134 perform emergency braking control of the vehicle. In order to explain emergency braking based on the vehicle speed of a vehicle running on a sloped road, the first braking section and the fourth braking section on the graph illustrated in FIG. 3 are explained.

The first braking section may generate a preset emergency braking force based on the first braking section of the aforementioned FIG. 2. Here, due to the driving conditions on a sloped road, a situation may occur where the vehicle speed is increased even when the preset emergency braking force is generated. However, since a collision may occur from a rear vehicle in the same lane, a vehicle is braked by maintaining the preset emergency braking force constant even when the vehicle speed is increased by a certain section.

The fourth braking section means a section where the emergency braking force is increased from a point in time when the vehicle speed braked on a sloped road exceeds a third threshold value even when the preset emergency braking force is generated.

The fourth braking section may increase the emergency braking force based on a change in the vehicle speed estimated from the plurality of wheel controllers 131, 132, 133, and 134. The fourth braking section may decrease the vehicle speed by increasing the emergency braking force for a period from the point in time when the vehicle speed is determined to be greater than the third threshold value to the point in time when the vehicle speed becomes lower than the third threshold value.

After the fourth braking section, the plurality of wheel controllers 131, 132, 133, and 134 monitor the vehicle speed detected from the plurality of wheel speed sensors 141, 142, 143, and 144. When it is determined that a vehicle has deviated from the driving conditions on a sloped road, the preset emergency braking force corresponding to the first braking section may be generated to control the braking of the vehicle.

According to an embodiment, the electronic mechanical brake apparatus may decrease the braking distance of a vehicle and reduce the time required to stop the vehicle compared to the conventional technology by generating the emergency braking force for each braking section based on the vehicle speed information.

In an electronic mechanical brake apparatus according to another embodiment, when the center controller 120 is determined to be in a fault state, the plurality of wheel controllers 131, 132, 133, and 134 may not receive a braking command from the center controller 120. In addition, when both the first communication line 151 and the second communication line 152 are determined to be in a fault state, the plurality of wheel controllers 131, 132, 133, and 134 may not share wheel speed information with each other. In this connection, the plurality of wheel controllers 131, 132, 133, and 134 receive each piece of wheel speed information from the plurality of wheel speed sensors 141, 142, 143, and 144, but may not estimate the vehicle speed and may not generate an emergency braking force based on a change in the vehicle speed.

The plurality of wheel controllers 131, 132, 133, and 134 according to another embodiment receives wheel speed information of each wheel using the plurality of wheel speed sensors 141, 142, 143, and 144 that are respectively connected. When information about the vehicle speed is unknown, the plurality of wheel controllers 131, 132, 133, and 134 may brake a vehicle while constantly maintaining a preset emergency braking force based on the first braking section illustrated in FIG. 2. Herein, the preset emergency braking force according to another embodiment may be an emergency braking force with relatively low deceleration in order to prevent a collision with a rear vehicle in the same lane. In addition, since the plurality of wheel controllers 131, 132, 133, and 134 do not know the vehicle speed information and perform emergency braking control using only the wheel speed information, it is desirable to decrease the wheel speed by constantly maintaining an emergency braking force with lower deceleration than the emergency braking force of the first braking section illustrated in FIG. 2.

The plurality of wheel controllers 131, 132, 133, and 134 according to another embodiment may generate an emergency braking force based on the fourth braking section illustrated in FIG. 3 after the first braking section. The plurality of wheel controllers 131, 132, 133, and 134 may generate an emergency braking force based on the fourth braking section from the point in time when the wheel speed is determined to be lower than the first threshold value. Herein, the plurality of wheel controllers 131, 132, 133 and 134 may monitor the changing wheel speed information because it is impossible to estimate the vehicle speed, and may increase the emergency braking force based on the change in the monitored wheel speed. Herein, the plurality of wheel controllers 131, 132, 133 and 134 may not know the vehicle speed information and may perform emergency braking control using only the wheel speed information, so it is desirable to decrease the wheel speed by increasing the emergency braking force with lower deceleration than the emergency braking force of the fourth braking section illustrated in FIG. 3.

The plurality of wheel controllers 131, 132, 133 and 134 may generate the emergency braking force based on the third braking section illustrated in FIG. 2 from the point in time when the wheel speed values measured from the plurality of wheel speed sensors 141, 142, 143 and 144 after the fourth braking section are determined to be lower than the second threshold value. Herein, since the plurality of wheel controllers 131, 132, 133, and 134 do not know the vehicle speed information and perform emergency braking control using only the wheel speed information, it is desirable to decrease the wheel speed by increasing the emergency braking force with lower deceleration than the emergency braking force of the third braking section illustrated in FIG. 2.

The plurality of wheel controllers 131, 132, 133, and 134 according to another embodiment may control the emergency braking of a vehicle based on the wheel speed information measured from the plurality of wheel speed sensors 141, 142, 143, and 144 respectively connected, even when the center controller 120, the first communication line 151, and the second communication line 152 are all determined to be in a fault state. The electronic mechanical brake apparatus according to another embodiment may decrease the braking distance of the vehicle and the time required to stop the vehicle compared to the conventional technology by generating the emergency braking force for each braking section based on the wheel speed information.

Figure 4:
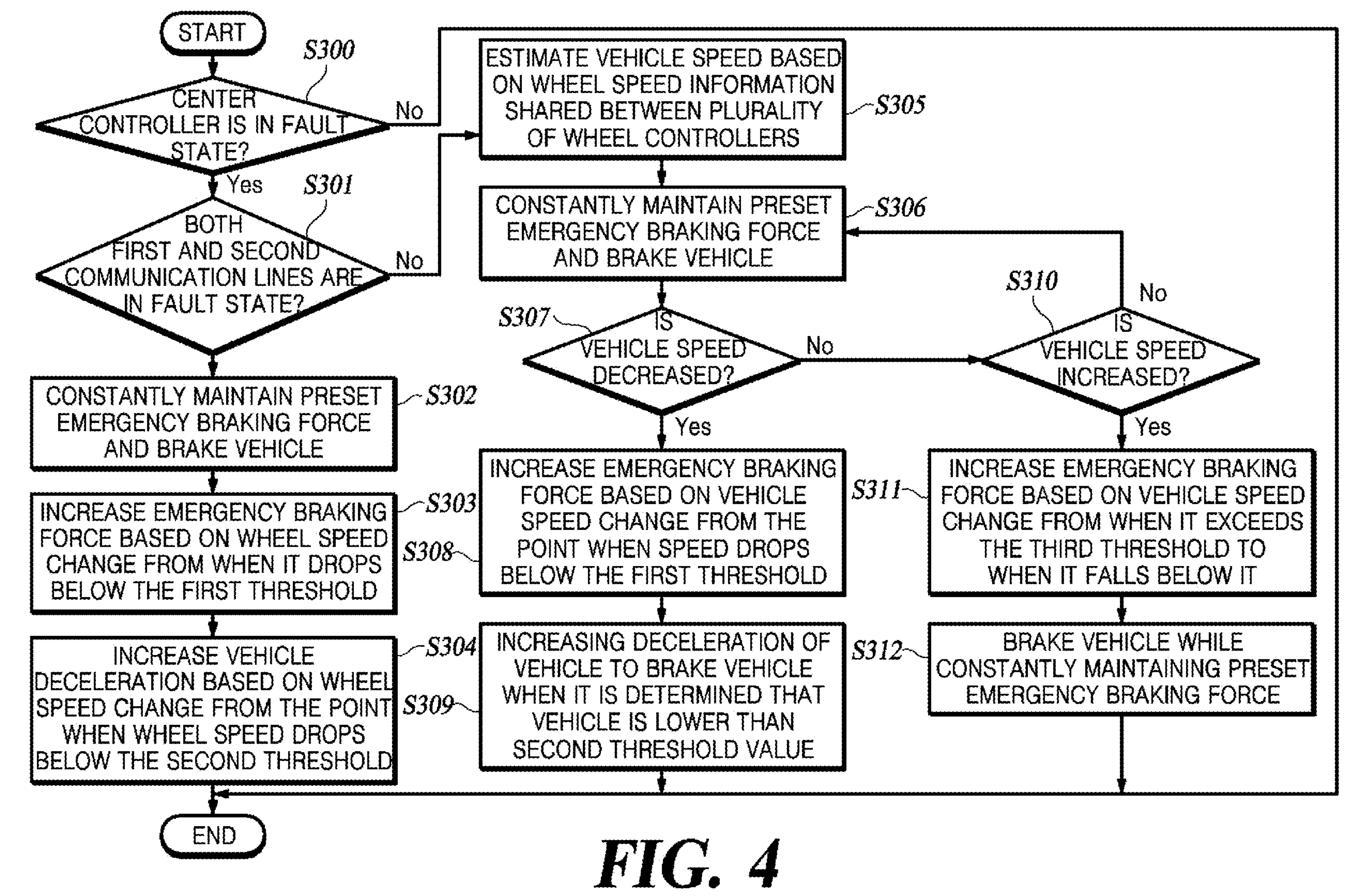
FIG. 4 is a flowchart showing a controlling method of an electronic mechanical brake apparatus according to an embodiment of the present disclosure.

FIG. 4 is a flowchart showing a controlling method of an electronic mechanical brake apparatus according to an embodiment of the present disclosure.

Referring to FIGS. 1 to 4, the plurality of wheel controllers 131, 132, 133, and 134 determine whether the center controller 120 is in a fault state (S300).

In process S300, when the center controller 120 is determined to be in a fault state, the plurality of wheel controllers 131, 132, 133, and 134 determine whether both the first communication line 151 and the second communication line 152 are in a fault state (S301).

In process S301, when both the first communication line 151 and the second communication line 152 are determined to be in a fault state, the plurality of wheel controllers 131, 132, 133, and 134 constantly maintain a preset emergency braking force and brake a vehicle (S302). When the center controller 120, the first communication line 151, and the second communication line 152 are all determined to be in a fault state, the wheel speed information may not be shared among the plurality of wheel controllers 131, 132, 133, and 134.

The plurality of wheel controllers 131, 132, 133, and 134 increase the emergency braking force based on a change in the wheel speed by using the plurality of electronic mechanical brakes from the point in time when the wheel speed is determined to be lower than the first threshold value (S303).

The plurality of wheel controllers 131, 132, 133, and 134 increase the deceleration of a vehicle based on a change in wheel speed to brake the vehicle from the point in time when the wheel speed is determined to be lower than the second threshold value (S304).

In process S301, when it is determined that neither the first communication line 151 nor the second communication line 152 is in a fault state, the vehicle speed is estimated based on the wheel speed information shared between the plurality of wheel controllers 131, 132, 133, and 134 (S305). When it is determined that neither the first communication line 151 nor the second communication line 152 is in a fault state, it may be determined that at least one of the first communication line 151 and the second communication line 152 is in an operable state.

The plurality of wheel controllers 131, 132, 133, and 134 constantly maintain a preset emergency braking force and brake a vehicle (S306).

The plurality of wheel controllers 131, 132, 133, and 134 determine whether the vehicle speed is decreased (S307).

In process S307, when it is determined that the vehicle speed is decreased, the plurality of wheel controllers 131, 132, 133, and 134 increase the emergency braking force based on a change in vehicle speed from the point in time when the vehicle speed is determined to be lower than the first threshold value (S308).

When it is determined that the vehicle speed is lower than the second threshold value, the plurality of wheel controllers 131, 132, 133, and 134 increase the deceleration of a vehicle to brake the vehicle (S309).

In process S307, when it is determined that the vehicle speed is not decreased, the plurality of wheel controllers 131, 132, 133, and 134 determine whether the vehicle speed is increased (S310). For example, when it is determined that the vehicle speed is not increased in process S310, the vehicle speed may be determined to be constant, and process S306 is performed.

The plurality of wheel controllers 131, 132, 133, and 134 increase the emergency braking force based on a change in vehicle speed from the point in time when the vehicle speed is determined to be greater than the third threshold value to the point in time when the vehicle speed becomes lower than the third threshold value (S311).

The plurality of wheel controllers 131, 132, 133, and 134 brake a vehicle while constantly maintaining the preset emergency braking force (S312).

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a random access memory (RAM), a compact disc ROM (CD-ROM), magnetic tape, a floppy disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Although operations are illustrated in the flowcharts/timing charts in this specification as being sequentially performed, this is merely an exemplary description of the technical idea of one embodiment of the present disclosure. In other words, those skilled in the art to which one embodiment of the present disclosure belongs may appreciate that various modifications and changes can be made without departing from essential features of an embodiment of the present disclosure, that is, the sequence illustrated in the flowcharts/timing charts can be changed and one or more operations of the operations can be performed in parallel. Thus, flowcharts/timing charts are not limited to the temporal order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A method for controlling, using a plurality of wheel controllers respectively connected to a plurality of wheel speed sensors, braking of a vehicle, the method comprising:

sharing, using a first communication line and a second communication line, wheel speed information acquired from the plurality of wheel speed sensors, and determining whether it is possible to estimate a vehicle speed of the vehicle using the shared wheel speed information;

in response to determining that it is possible to estimate the vehicle speed using the shared wheel speed information, generating, based on a change in the vehicle speed, an emergency braking force to brake the vehicle; and in response to determining that it is not possible to estimate the vehicle speed using the shared wheel speed information, generating, based on a change in a wheel speed, the emergency braking force to brake the vehicle, wherein generating, based on the change in the vehicle speed, the emergency braking force to brake the vehicle comprises:

constantly maintaining a preset emergency braking force to prevent a collision with a rear vehicle in a same lane;

determining whether the vehicle speed has increased or decreased; and based on determining whether the vehicle speed has increased or decreased, increasing the emergency braking force in comparison to a predetermined threshold value.

2. The method of claim 1, wherein determining whether it is possible to estimate the vehicle speed comprises determining whether at least one of the first communication line and the second communication line is operable by the plurality of wheel controllers.

3. The method of claim 1, wherein increasing, based on whether the vehicle speed has increased or decreased, the emergency braking force in comparison to the predetermined threshold value comprises:

in response to determining that the vehicle speed has decreased, increasing, based on the change in the vehicle speed, the emergency braking force when the vehicle speed is determined to be lower than a first threshold value; and increasing deceleration of the vehicle to brake the vehicle when the vehicle speed is determined to be lower than a second threshold value.

4. The method of claim 1, wherein increasing the emergency braking force in comparison to the predetermined threshold value comprises:

in response to determining that the vehicle speed has increased, increasing, based on the change in the vehicle speed, the emergency braking force for a period from when the vehicle speed is determined to be greater than a third threshold value to when the vehicle speed becomes lower than the third threshold value; and braking the vehicle while constantly maintaining a preset emergency braking force.

5. An electronic mechanical brake for a vehicle, comprising:

a pedal sensor configured to sense an input stroke representing a braking intention of a driver;

a center controller configured to generate a braking command corresponding to the sensed input stroke, the center controller comprising a first controller and a second controller;

a plurality of wheel controllers configured to receive the braking command from the center controller and generate a braking force based on the received braking command using a plurality of electronic mechanical brakes respectively disposed at a right front wheel, a left front wheel, a right rear wheel, and a left rear wheel of the vehicle;

a plurality of wheel speed sensors respectively connected to the plurality of wheel controllers and configured to sense a plurality of wheel speeds of the right front wheel, the left front wheel, the right rear wheel, and the left rear wheel; and a transceiver comprising a first communication line and a second communication line configured to transmit and receive signals between the center controller and the plurality of wheel controllers, wherein, the plurality of wheel controllers is configured, when the center controller is determined to be in a fault state, to determine whether at least one of the first communication line and the second communication line is operable, and determine whether it is possible to estimate a vehicle speed of the vehicle using the plurality of wheel speeds, wherein the plurality of wheel controllers is further configured, in response to determining that it is possible to estimate the vehicle speed using the plurality of wheel speeds, to generate an emergency braking force based on a change in the estimated vehicle speed, and wherein, to generate the emergency braking force to brake the vehicle based on the change in the vehicle speed, the plurality of wheel controllers is further configured to:

constantly maintain a preset emergency braking force to prevent a collision with a rear vehicle in a same lane;

determine whether the vehicle speed has increased or decreased; and based on determining whether the vehicle speed has increased or decreased, increase the emergency braking force in comparison to a predetermined threshold value.

6. An electronic mechanical brake for a vehicle, comprising:

a pedal sensor configured to sense an input stroke representing a braking intention of a driver;

a center controller configured to generate a braking command corresponding to the sensed input stroke, the center controller comprising a first controller and a second controller;

a plurality of wheel controllers configured to receive the braking command from the center controller and generate a braking force based on the received braking command using a plurality of electronic mechanical brakes respectively disposed at a right front wheel, a left front wheel, a right rear wheel, and a left rear wheel of the vehicle;

a plurality of wheel speed sensors respectively connected to the plurality of wheel controllers and configured to sense a plurality of wheel speeds of the right front wheel, the left front wheel, the right rear wheel, and the left rear wheel; and a transceiver comprising a first communication line and a second communication line configured to transmit and receive signals between the center controller and the plurality of wheel controllers, wherein, the plurality of wheel controllers is configured, when the center controller is determined to be in a fault state, to determine whether at least one of the first communication line and the second communication line is operable, and determine whether it is possible to estimate a vehicle speed of the vehicle using the plurality of wheel speeds, wherein the plurality of wheel controllers is further configured, in response to determining that it is possible to estimate the vehicle speed using the plurality of wheel speeds, to generate an emergency braking force based on a change in the estimated vehicle speed, wherein the plurality of wheel controllers is further configured, in response to determining that it is not possible to estimate the vehicle speed using the plurality of wheel speeds, to generate an emergency braking force based on a change in the plurality of wheel speeds, and wherein, to generate the emergency braking force based on the change in the plurality of wheel speeds, the plurality of wheel controllers is further configured to:

brake the vehicle while constantly maintaining a preset emergency braking force to prevent a collision with a rear vehicle in a same lane;

increase, based on the change in the plurality of wheel speeds, the emergency braking force when the plurality of wheel speeds measured from the plurality of wheel speed sensors is determined to be lower than a first threshold value; and brake the vehicle by increasing, based on the change in the plurality of wheel speeds, deceleration of the vehicle when the plurality of wheel speeds measured from the plurality of wheel speed sensors is determined to be lower than a second threshold value as the plurality of wheel speeds decreases.

* * * * *